H. G. BECKER.
DRIFTING VALVE APPARATUS FOR LOCOMOTIVES.
APPLICATION FILED AUG. 25, 1916.

1,311,034.

Patented July 22, 1919.
6 SHEETS—SHEET 1.

Inventor:
Harry G. Becker.
By his Atty.

H. G. BECKER.
DRIFTING VALVE APPARATUS FOR LOCOMOTIVES.
APPLICATION FILED AUG. 25, 1916.

1,311,034.

Patented July 22, 1919.
6 SHEETS—SHEET 5.

Inventor:
Harry G. Becker:
By his Atty, F. H. Richards.

H. G. BECKER.
DRIFTING VALVE APPARATUS FOR LOCOMOTIVES.
APPLICATION FILED AUG. 25, 1916.

1,311,034.

Patented July 22, 1919.
6 SHEETS—SHEET 6.

Inventor:
Harry G. Becker.
By his Atty, F. H. Richards.

UNITED STATES PATENT OFFICE.

HARRY G. BECKER, OF WATERVLIET, NEW YORK.

DRIFTING-VALVE APPARATUS FOR LOCOMOTIVES.

1,311,034. Specification of Letters Patent. Patented July 22, 1919.

Application filed August 25, 1916. Serial No. 116,776.

*To all whom it may concern:*

Be it known that I, HARRY G. BECKER, a citizen of the United States, residing in Watervliet, in the county of Albany and State of New York, have invented certain new and useful Improvements in Drifting-Valve Apparatus for Locomotives, of which the following is a specification.

A principal object of my invention is to furnish an auxiliary stem-supply and drifting-valve apparatus especially adapted for use on superheater locomotives. My present improvements are applicable wholly or in part to the cylinders of engines in general which have reciprocating pistons, and especially to steam engines operating under conditions where the motive-power steam-supply is intermittent, as for instance in cases where a stationary engine is running idle,—as by momentum of the fly-wheel,—or where a locomotive engine is running along a railway track while the throttle valve of the engine is closed, thus making the engine to move along under the condition usually designated as "drifting".

When my improvements are applied to superheater locomotives, the throttle valve operates to control in the usual manner the supply of motive-power steam from the boiler to the cylinders, by a relatively indirect route through the superheater, while the auxiliary supply of saturated steam is conducted by a more direct route from the boiler to the cylinder-mechanisms through their by-pass lines. The drifting valve being in position and arranged in said auxiliary connection for cutting off said supply of saturated steam on the admission of steam from the superheater to the cylinder-mechanism, this mechanism is thus supplied with only a relatively small amount or increment of the saturated steam during the times when the main steam-supply is cut off. On the cessation of the main or motive-power steam supply while the locomotive is running, the drifting valve,—in my present improvements,—is automatically opened by the pressure of the said auxiliary steam supply combined with compression acting through a by-pass port, for thereby instantly admitting the required increment of saturated steam directly from the boiler and without passing through the superheater, thereby to condition the steam or vapor content of the spaces within the cylinder-mechanism while the engine is in operation but is not working to supply power.

A further object of my present invention is to so organize and combine together the auxiliary steam-supply apparatus and the cylinder-mechanism as to provide, not only for properly admitting and cutting off the supply of saturated steam to the idly running cylinder-mechanism, but also on the opening of the auxiliary valve to open or effect a communication between the opposite ends of the cylinder itself whereby to accomplish by one simple and effective means, two important results. First, to open such communication between the opposite ends of the cylinders automatically and in an instantaneous manner; and, second, to so supply the increment of saturated steam to the cylinder mechanism as to distribute this steam increment alternately toward and to the opposite ends of the cylinder, so that the inflowing saturated steam will flow and expand directly into the cylinder, and be distributed to and cut off therefrom, in the same manner when the engine is idly running, or drifting, as the motive-power steam is distributed and cut off during the normal operation of the engine in supplying power. A further object is to accomplish those operations in such an instantaneous and effective manner as to ordinarily prevent "flashing" of the lubricating oil in the cylinders, when, in high-pressure superheater engines, the motive-power steam is shut off.

In the accompanying drawings forming a part of this specification.

Fig. 3 is a diagram illustrating the organization and systematic arrangement,—and is also illustrative of the mode of operation,—of my present improvements when these are applied to a superheater locomotive of the general character indicated in Figs. 1 and 2, as hereinafter more fully described.

Fig. 3ᵃ is a view similar to a portion of Fig. 3 for illustrating a modification in certain features of the "drifting valve", which as a whole is designated by D, and is shown in Fig. 3 in a preferred form and arrangement thereof.

Fig. 3$^b$ is an enlarged and diagrammatic view of a portion of the valve-casing and the operable valve-member therein, for more fully illustrating several features of the co-acting ports and faces of the valve seat and valve; and, Fig. 3$^c$ is view corresponding to a portion of Fig. 3$^b$, but showing the valve member in closed position.

Fig. 5 is a vertical sectional view of the drifting valve mechanism on line X$^5$ in Fig. 4, and showing the operable valve-member, 2, raised to its closed position.

Fig. 5$^a$ is a fragmentary view similar to a portion of Fig. 5, for illustrating certain variations of the details thereof.

Fig. 6 is a view corresponding to Fig. 5 except that said valve member 2 is here shown lowered into its open position.

Figs. 6$^a$, 6$^b$, and 6$^c$, are horizontal sectional views taken on the lines X$^{6a}$, X$^{6b}$, and X$^{6c}$, respectively, of Fig. 6.

Similar characters designate like parts in all of the views.

Referring to the drawings, my present improvements are therein illustrated in one arrangement applicable to locomotive steam engines of a conventional type which, being so well-known and extensively used, will be sufficiently understood without a more particular or detailed description thereof than is incidentally given in the following description.

As commonly constructed and arranged, such locomotives are or may be provided with some suitable boiler, as B, usually having a steam-dome, as B$^2$; a cylinder-mechanism comprising some suitable cylinder, as C, (provided as usual with a piston, as M, and with suitable ports, as $p$, $p'$), a valve-chest indicated as a whole by T, (Figs. 1, 2, 7 and 8), having therein the interior valve-chamber, as V$^2$, and an engine valve, as V; a main steam pipe, as S, leading from as V; a main steam pipe, as S, leading from a suitable point within the boiler (which point is usually or may be in the steam-dome) to the cylinder-mechanism where this pipe or conduit enters the valve-chest V$^2$ for supplying the motive-power steam to the cylinder C; and a throttle-valve applied and operated in a usual manner. Said throttle valve, indicated at R, Fig. 3, may be of any usual or suitable description, and may be operated by the usual appliances, (not herein shown).

By reason of the relations of the faces of the valve-member 2 and the valve-seat surfaces of the valve-chamber in the casing 1 which faces and surfaces are inclined to the line of valve movement, the initial opening movement of the valve-member is a space-forming movement, and not merely a sliding movement, so that the port-openings are closed and opened by the approach and recession of one said surface toward and from the other, as the case may be. The valve-seat-surface, as 1$^d$, being in the form, geometrically, of a truncated cone, and the valve-surface 2$^d$, (see Figs. 3$^b$, 3$^c$, 5, 6), being of a corresponding conformation, the by-pass ports, as $h^2$, $h^{2'}$, stand in such a position that a pressure therein acts not only transversely to the valve as indicated by the arrow $r^7$ in Fig. 3$^c$, but also downwardly as indicated by the arrow $r^9$, in said Fig. 3$^c$, in which the proportionate effect of such downward action is indicated diagrammatically by the dimension $y^2$. And when a suction occurs in a by-pass port, said dimension $y^2$ similarly indicates the resultant upward pull upon the valve-member 2 for effecting the closure not only of the by-pass port, but of all of the ports controlled by said valve-member.

The auxiliary steam conduit 20 is shown connecting one of said valve-chamber port-openings, $h^4$, with the boiler, and the two by-pass conduits, as 8, 9, lead from the opposite ends of the cylinder to the said two port-openings, as $h^2$ $h^{2'}$, respectively, which are located in said inclined valve-seat surface, 1$^d$, of the casing. Any admission, however small, of the auxiliary steam-supply through the port $h^4$, is accompanied by a coincident and proportionate opening of the by-pass, and vice versa.

The operable part, as 2, of the drifting valve D is made up, preferably, in a single piece, since this construction is in itself a safeguard against getting out of order; also, and for similar reasons, this valve should be so made as to work properly without the use of packing rings, since such devices are too sensitive and delicate when made in the relatively small sizes required, for giving satisfactory service under the severe conditions which usually obtain in high-pressure locomotives, and especially when these are also superheater engines.

The valve member 2, is herein shown so constructed and arranged as to have or require no closely fitted guide-surfaces, no packing-rings or piston-like parts, and no valve-face areas having any sliding contact, since all of these features have always and necessarily, a frictional resistance which in practice might be sufficient to prevent or unduly reduce the normal rotative movements whereby evenness of wear will be secured. By reason of this construction and arrangement the valve-member 2, during the opening and closing strokes thereof, is free to be gradually rotated, and still be effective in closing and opening said port-openings, since the conical end $2^p$, thereof—which in specific form is thus a truncated cone and also in the nature of a tapered plug—will correspond to and closely fit against the seat $1^d$, when the valve-member 2, is raised in Fig. 5. That the valve-member 2, does rotate, I have determined by observation, under and by the action of the rotational motion or "whirl" (sometimes designated as "vortex motion") which, as I apprehend, is normally produced to some extent and frequently if not constantly within the valve-chamber 1, by the rapidly flowing and changing currents which occur therein.

Figures 5, 5A:
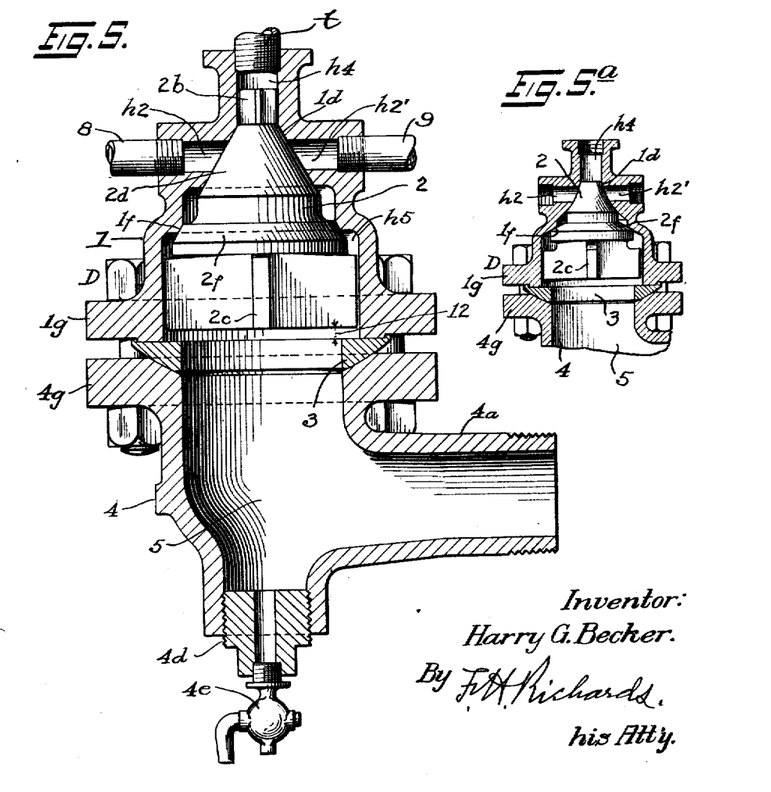

In the present instance, the operable part 2, of the valve 2 is shown provided at the upper end thereof, with the 4-wing guiding stem $2^b$, Fig. 5, and at the lower end thereof, with four ordinary guide-ribs or ways $2^c$, but any other suitable guiding means,—if and when any such are required,—may be used instead of the parts $2^b$, $2^c$. The valve 2 is also shown provided with the upper face (or face-zone) $2^d$, of relatively small diameter, and with the lower face (or face-zone) $2^f$, of a relatively larger diameter. For convenience of manufacture, said face zones $2^d$ and $2^f$ may be located as surfaces in the same geometric cone, (as clearly drawn in Fig. 5).

Figure 4:
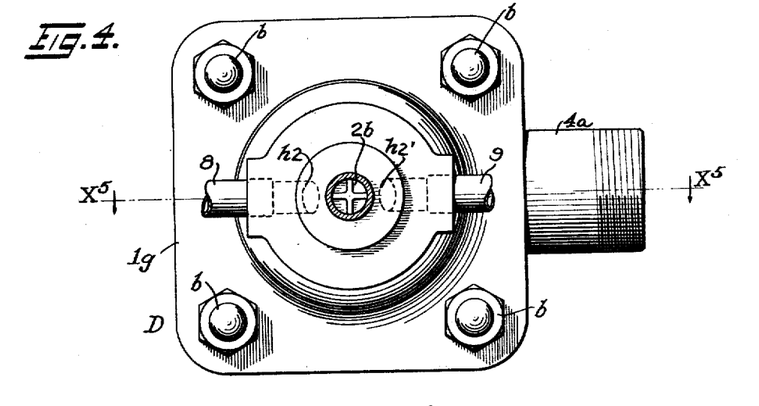
Fig. 4 is a plan view on an enlarged scale of the drifting valve when made of a form corresponding to the illustration thereof in said Fig. 3.

The valve-member 2 may be arranged in a chamber space within a casing of any suitable form, and for this purpose I prefer to use a casing substantially such as the casing 1, which surrounds or incloses the valve 2, which is provided with the upper seat $1^d$ and lower seat $1^f$,—for the valve face-zones $2^d$ and $2^f$, respectively,—and with a flange, $1^g$, whereby to detachably secure the casing to a lower member, 4. This attachment of the member 1 to the member 4 may be made in a convenient manner by means of a flange, $4^g$, and a series of bolts, as $b$, $b$, arranged in the well-known manner indicated in Figs. 4 and 5. The stroke, or "lift", of the valve 2 will be governed, of course, by the distance 12,—as shown in Fig. 5,—between a lower surface of the casing 1 and the upper surface of the joint ring 3. The use of a joint ring, as 3, (in itself a well-known device in other kinds of steam apparatus) is deemed to be preferable because readily replaceable for the purpose of repair, and because it provides for a slight swivel action as between the members 1 and 4, when assembling the mechanism. A plug, $4^d$, provided with a cock or discharge valve $4^e$, may be arranged on the member 4, (Figs. 5, 6), whereby to draw off condensed water or steam, as occasion may require.

Figure 1:
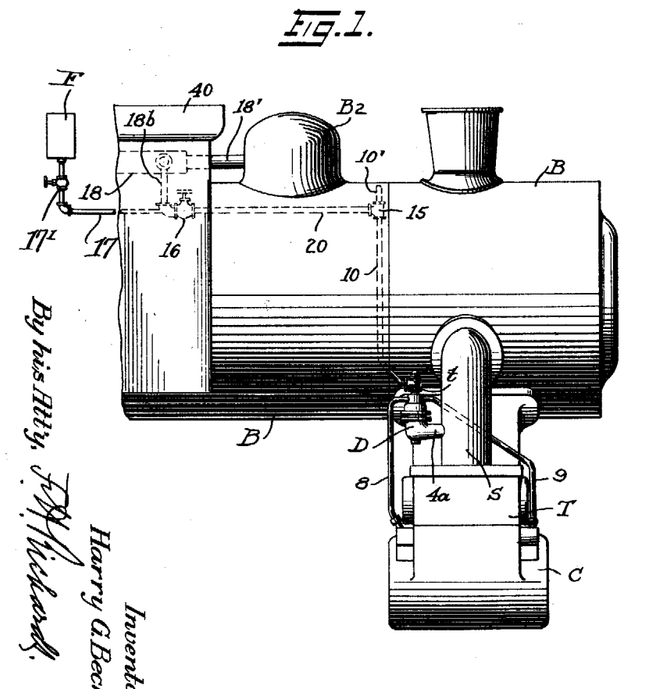
Figure 1 is a side view of a portion of the forward part of a locomotive of a conventional type, having applied thereto my present improvements in one preferred arrangement thereof.
Figure 2:
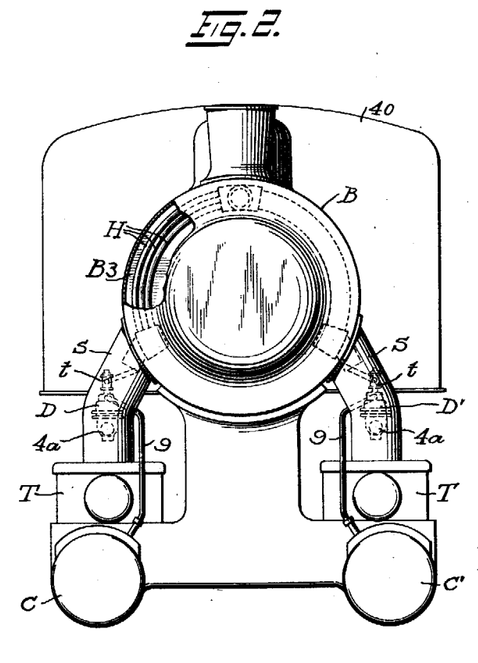
Fig. 2 is a front elevation showing the parts illustrated in Fig. 1, as seen from a point at the right hand of Fig. 1.
Figures 3, 3A, 3B, 3C:
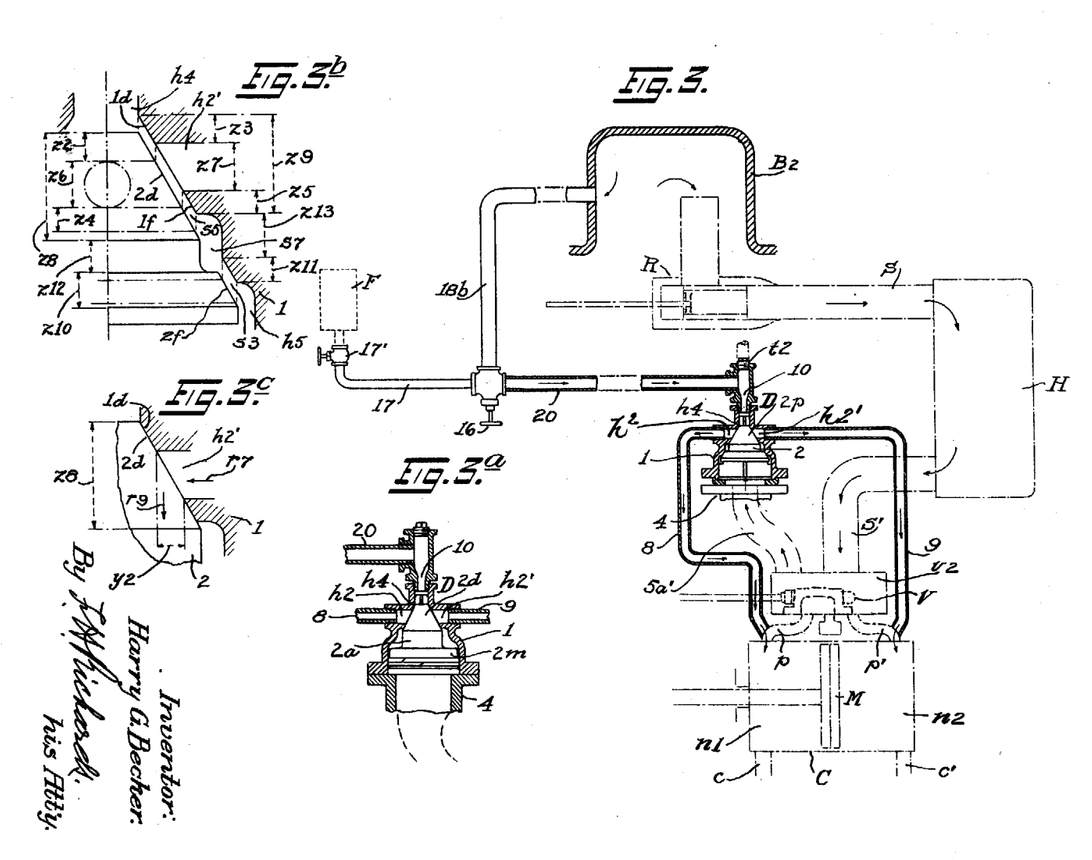

For connecting the valve-chamber within the casing 1, through the space 5 of the conduit member 4, with the engine valve-chamber $V^2$, said member 4 may have any suitable pipe or conduit leading directly into said valve-chamber (Figs. 3 and 7) or into the motive-power steam pipe at some point between the superheater and the cylinder mechanism, as indicated in Figs. 1, 2, 7 and 8. For this purpose the "fitting" of base-member, 4, of the valve device D is shown in Figs. 1, 2, 4, 5 and 6, provided with the conduit portion or pipe $4^a$, whereby the said connection of the drifting-valve with the main steam pipe, as S, may be made at a point a short distance above the cylinder mechanism; this latter arrangement is the one indicated in Figs. 1 and 2, and is deemed preferable for engines having the ordinary forms of slide valves, and it does not materially interfere with the removal and replacement of the usual valve-chest, as T, (Figs. 1 and 2.), when made of the well-known separable form there indicated. In Fig. 3, the conduit within member 4 is shown by dash lines at $5^{a'}$ as having a connection directly with the valve chamber $V^2$. Also, in this diagram, the main steam pipe is shown divided into two portions, S, S', which (in superheater locomotives) connect as in ordinary practice through a superheater, diagrammatically indicated by dotted lines at H. In Fig. 2, a portion of the usual front plate (cover) of the "smoke box", $B^3$, is broken away to show more clearly the superheater, H, when this comprises a group of curved pipes, as in one of the well-known kinds in common use.

Figure 7:
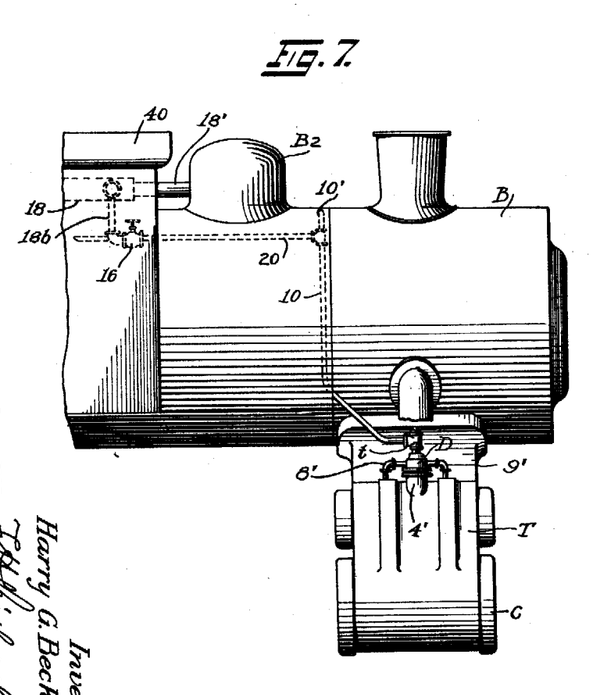
Figs. 7 and 8 are respectively, a side view and an end view corresponding to Figs. 1 and 2, but showing the drifting valve, D, applied to a locomotive in which the cylinder mechanism is provided with a piston valve, instead of being provided with the ordinary type of slide valve as indicated in Fig. 3.
Figure 8:
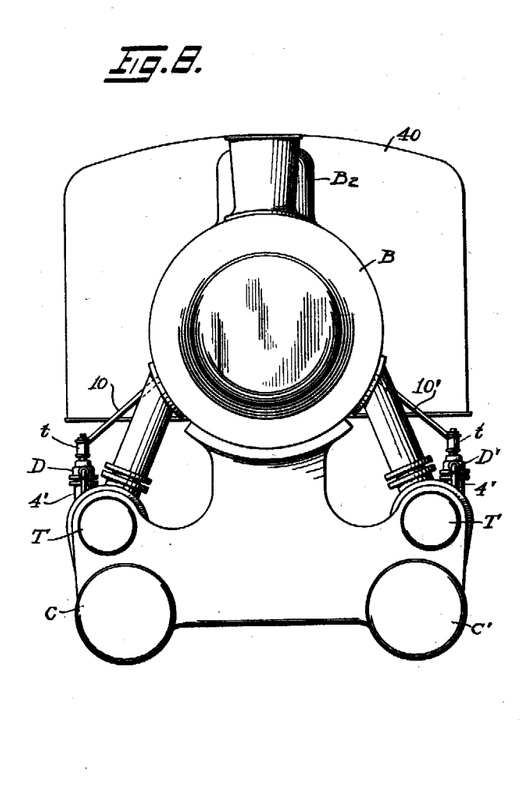

In Fig. 1,—also in Fig. 7, a turret, 18, located within the cab, 40, is shown connected by a supply pipe, 18', with the steam dome $B^2$ of the boiler B. From the turret 18, a steam pipe, $18^b$, leads to the regulating valve 16, and from this valve (thus located in the cab) a steam line, of suitable size is run to the drifting valve D. In practice, this steam line, 20, may comprise one pipe connecting at the T 15 with two similar pipes, as 10, 10', which may lead to the right-hand and left-hand drifting valves at D and D', respectively, as indicated in Figs. 2 and 8. In Fig. 1, said pipes 10, and 10', are indicated mainly by dotted lines, since they will usually be run for protection under the usual boiler-covering, or jackets, and hence will not be seen in a side-elevation view of the locomotive. Thus one valve at 16, will equally control or regulate the admission of the auxiliary supply of saturated steam to the cylinder mechanisms on both sides of the locomotive, and therefore the description of details and their mode of operation, is herein given in connection with only one of the sets of mechanism, this set being the one shown in Fig. 1, and also at the left-hand in Fig. 2. The particular pipe 10 is herein considered to be merely one part of the steam-line 20.

As a convenient means for connecting the described auxiliary steam line to the valve device D, the casing 1 thereof may have at its upper end (Figs. 1 and 5), a T member, $t$, into which the pipe length 10 is connected.

For use in regularly supplying lubricator to the steam line 20, I prefer to locate some suitable oil reservoir or feeding mechanism at F, within the cab, and connect the same by a pipe, 17, (Fig. 3) having therein a regulating valve, at 17'; however other suitable devices or arrangements may be substituted for those here indicated for said purposes. Oil thus entering the line or pipe 20, will be carried and distributed, when the locomotive is drifting, to all parts of the valve-chambers and cylinders. Before leaving a terminal, the engineer will open the valve 16 in the cab, thus allowing the saturated steam to flow into steam-line 20, and thence through the drifting valve, D, and to each of the cylinder-mechanisms of the locomotive.

When the throttle-valve is opened, the motive-power steam after reaching the cylinder-mechanism flows from the valve-chamber, $V^2$, through the passage 5 and thus comes to the bottom of the valve 2 and thereby normally raises this valve to its seat $1^f$, (Fig. 5), thereby shutting off the flow of saturated steam at the port opening $h^4$, and also closing the adjacent ends of the relief passages or conduits 8 and 9. The valve 2 normally remains closed as long as the throttle is open, but when the throttle is closed and the engine starts drifting the valve 2 will drop.

Figures 6, 6A, 6B, 6C:
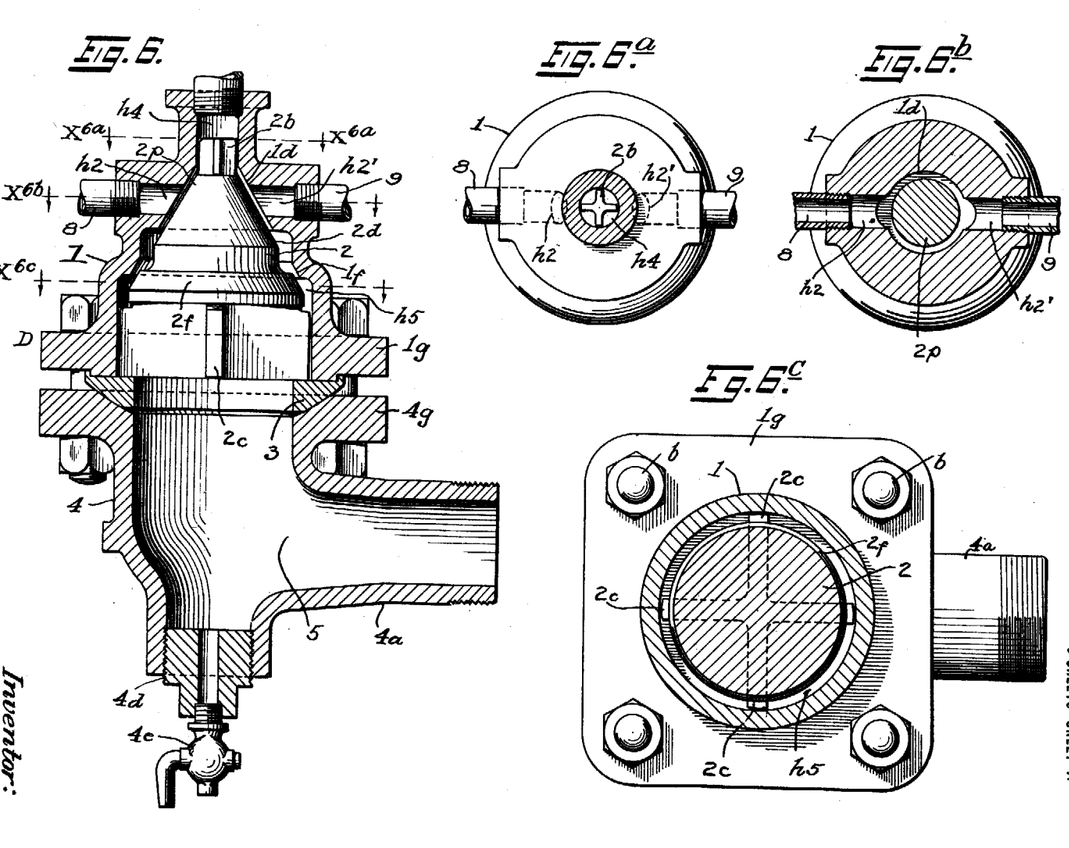

In this open position, the said valve-disk or operable member, 2, rests on the jointing-ring 3, and the upper valve-face $2^d$ is so far lowered as to leave an ample space (Figs. 6, $6^b$) for the saturated steam to flow from the pipe 10, around said valve-face $2^d$ and through the pipe or conduits 8, 9, to the ends, $n^1$, $n^2$, respectively, of the cylinder C,—see Fig. 3; this is the normal position of the valve 2 when the engine is standing and the throttle is closed.

In this organization of the details of the valve-device D, in the special form and arrangement thereof shown in Figs. 5 and 6, one pair of the described port-openings,— as $h^4$, $h^5$ (Figs. 3, 5, 6),—are located not only in a relatively transverse position, (as compared with said pair $h^2$ $h^{2\prime}$), but are also located in the direction of the line of movement of the valve-member 2, and concentrically of the axis of said member 2, when this is regarded as a rotatable member. Thus in the peculiar arrangement herein described of the four conduits leading to and from the valve device D, one of the said ports, as $h^4$, supplies steam to all of said other port-openings, while another conduit port, as $h^5$,—which is functionally opposite to the port $h^4$,—supplies steam to the member 2 in a reverse direction, and (in part or wholly, as the case may be) from the valve-chamber, as $V^2$, of the cylinder-mechanism. In the aforesaid arrangement, therefore, there is one steam conduit which connects the port-openings $h^4$, with the boiler; a second conduit $5^{a\prime}$ which connects the port-openings $h^5$, with the valve-chest chamber (as $V^2$, Fig. 3) of the cylinder mechanism; and two conduits, as 8, 9, leading, respectively, from the other two port-openings, as $h^2$, $h^{2\prime}$, to the opposite ends, respectively, of the cylinder. It will be noted that the port-opening $h^5$ is here shown extending from the seat $1^f$ to the lower end of the casing 1, and that the conduit space 5 may be regarded as a continuation of said port $h^5$.

While the valve face is designated as a whole by $z^8$, (Fig. $3^b$), it is necessary to distinguish between the three component zones, $z^2$, $z^4$, and $z^6$ thereof, since each of these has a special function and purpose not fully shared by the others. The upper zone, $z^2$, should the mid-zone 26 and lower zone 24 be cut away, would still close the port $h^4$ on the up-stroke of the valve-member 2; in that case, however, the ports $h^2$, $h^{2\prime}$ would be in communication notwithstanding that "closed" position of said valve-member 2. Said mid-zone $z^6$ has an analogous and special purpose, since it serves to close said communication between the side-ports $h^2$, $h^{2\prime}$, while the lower zone $z^4$ serves to close access from below to said side-ports, and does this without the aid of said mid-zone. Thus while said several zones coöperate for a relatively general purpose, each one has a different location and serves a relatively separate and special purpose. From the one central valve-chamber space within the casing 1, the steam flows at certain times, outwardly through each one of said four ports, or passages; at other times, it flows inwardly through each one of said ports. Thus, there are four directions of ingress and egress of steam with respect to one and the same central valve-chamber space, and through that central space each one of said four ports communicates directly with each of the other three said ports.

While the steam coming directly from the boiler through the auxiliary conduit 20, operates with full effect upon the area of the port-opening $h^4$, and so operates in the direction of opening movement of this valve, the steam coming through the by-pass line to the port-opening $h^2$, or $h^{2'}$, has a relatively reduced effect as regards the downward actuation of the valve, by reason of these several port-openings being located, respectively, in the described transverse and inclined relative positions. Thus the amount of force applied through either side port-opening,—as $h^2$ or $h^{2'}$,—against the plug-like end $2^p$ of the member 2, normally is only partially transmitted into a force acting longitudinally of the axis (line of movement) of said member 2. Under some conditions, however, as when suddenly reversing the locomotive while running and when the engine valve and piston are in a particular position, a high-compression in one end of the cylinder may operate,—by such partially transmitted effect, especially if there should be any considerable amount of water in the cylinder—to open the valve 2, which thus becomes a relief valve by opening a line of communication or circulation, between the two ends of the cylinder. Therefore, the valve device D, when thus connected and arranged, may be considered as being, in one combined device, a relief-valve, a circulating-valve and a drifting-valve.

Figure 9:
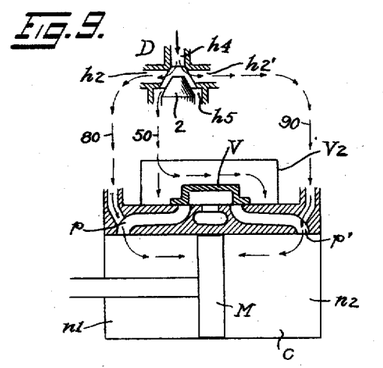
Figs. 9, 10, 11 and 12, are a series of diagrams illustrative of the mode of operation of the drifting-valve apparatus, as hereinafter more fully explained.
Figure 10:
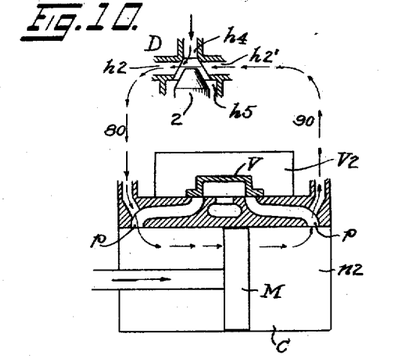
Figure 11:
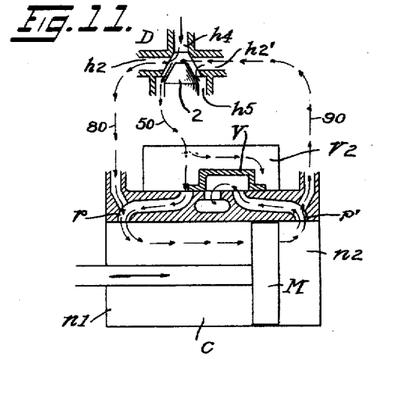
Figure 12:
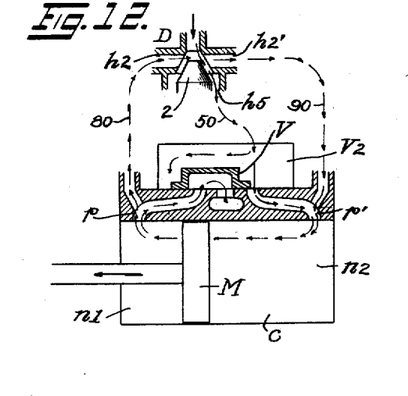

The said system and arrangement of port-openings, as will now be evident, comprises a "by-pass,"—or circulation conduit or channel,—around both the piston M and valve V, and also two channels which, in alternation, extend from the cylinder-ends, respectively, to the valve-chamber $V^2$, and are opened and closed by the valve V. For illustrating these peculiar features, reference is made to the diagram Figs. 9 to 12, inclusive, in all of which the valve 2 is in open position. In Fig. 9,—the valve 2 being open,—the engine ports $p$, $p'$, are covered by the valve V, so that while the piston M is stationary, the steam entering the valve-chamber (of the drifting-valve D) by the port $h^4$ will flow to the cylinder mechanism through three paths, or courses, indicated by the arrow-lines 80, 50, 90, representing the conduit-lines 8, 5, and 9, respectively. In Fig. 10, the piston, M, (the valve V remaining closed as in Fig. 9) is moving toward the cylinder end $n^2$, thus reversing the flow in path 90, while accelerating the flow in path 80 by suction. In Fig. 11, the valve V has moved to open the port $p$ while the piston M continues moving to the right-hand, (as in Fig. 10), with the result of modifying the flowing currents as here indicated by the several arrow-lines, which together indicate a normal operation of the drifting-valve while the locomotive is drifting and has the reverse-lever set forward for causing a relatively free exhaust from the cylinder to the stack. Fig. 12 represents the same operations and conditions as are set forth in Fig. 11, but with the piston movement reversed, as will now be obvious from a comparison of the drawings and the lines thereof, without further description.

By making the valve-seat $1^d$ of the conical form, this seat is, or becomes, a single seat or surface, within the area of which are located two port-openings $h^2$, $h^{2'}$; and, since such seat, being preferably a cone, is also circular in transverse section, (Fig. 6$^b$), when said two port-openings are located in any non-connecting position in the area of said seat, thereby said port-openings are "opposite" therein, or oppositely-disposed therein, within the meaning of these terms as herein employed. Similarly, while the end portion $2^p$ of the valve 2 is preferably a true cone in form, in practice this "cone" may be only approximately of that geometric shape or construction, and the chief advantages of the truly conical construction will be obtained when and so long as that portion, $2^p$, is both tapering and circular in transverse section, since this construction provides for the valve-member 2 to be rotatable without interfering with the reciprocation thereof. These minor variations in the said conical or tapering portion, may be of different degrees and kinds, and as an instance thereof, one such is illustrated in the fragmentary view, Fig. 5$^a$, where the valve face $1^d$ is shown on a curved line, or concaved, (in longitudinal section), while obviously circular in transverse section, at all points in the length thereof. Also, in this view the guide portion $2^b$ (of Fig. 5) is omitted.

These features as indicated above and in said Fig. 5$^a$, may also extend to the valve-seat $1^f$, which is here shown as having an angular position somewhat different from the one shown in Fig. 5. By a comparison of these views as described, it will be evident that the arrangement of Fig. 5 has an important practical advantage in having the two faces $1^d$ and $1^f$ arranged as continuations each of the other in one conical geometric surface,—especially since, during the closing movement, each of said faces then approaches its seat with the same ratio of space-reduction as regards the space (which may exist at any given moment) between a said valve face and its said seat.

The connecting or by-pass conduit, as 8, 9, between the ends of the cylinder, serves as a means whereby the auxiliary supply of saturated steam, or of lubricator and steam combined while being supplied to the cylinder-mechanism in a non-actuating quantity during the intermissions of the motive-power steam-supply, will be in part forced back and forth between the ends of the cylinder and thus more fully utilize the lubricator material. But, in practice, some portion of this auxiliary and composite supply, will usually pass through the exhaust valves, and thus be discharged through the exhaust-pipe and stack; and, in locomotives, this discharge may be in such quantity as to aid in "blowing" the fire while the engine is "drifting", and also while standing.

By reason of the automatic operation thereof, the drifting-valve requires no attention from the engineer while making a run, but when making a long stop he should usually close the regulating valve 16 which for his convenience should be located within the cab (as 40, Figs. 1 and 7) of the locomotive. In some cases, especially when making only a short stop, the said regulating valve 16 need not be closed, and at such times the engineer may open the usual blow-off cocks (with which such cylinder-mechanisms are ordinarily provided, in about the positions indicated at $c$, $c'$, Fig. 3), and thus discharge from the cylinders such condensations as may be formed during the stop from the condensation of the saturated steam.

In some instances, within the purview of my invention, the described third passage-way, $h^5$, for the auxiliary steam-supply may be omitted, and the valve D be so arranged that the saturated steam does not flow past the valve 2 into the space 5. Such a modified or less complete embodiment of my present invention is illustrated in Fig. 3ª, where the valve-member,—here designated by 2ª,—is shown provided with the upper face $2^d$, (which may be the same as the said face in Fig. 5), while the lower face $2^f$ (of Fig. 5) is replaced by an ordinary piston, $2^m$; in practice, of course, this piston should be made of a size suitable for operating the valve, in view of the steam pressure employed and the other operating conditions. By comparison of the two arrangements, that is, of the valve 2 as described in connection with Figs. 3, 5, 6, and of the valve 2ª as shown in Fig. 3ª, it will be evident that in its general operation, and except as to the direct passage from the conduit 10 to the valve chamber $V^2$, the two valves, 2 and 2ª, may be regarded as being the same in and for the purposes of some of the combinations defined in the claims of this application.

When the locomotive is drifting and the cylinder valve, as V, has a stroke for alternately uncovering the ports $p$, $p'$, the operation of the engine piston M draws steam into the cylinder through two channels, or paths, at the same time, i. e. through one of the pipes, as 9, and also through the conduit space, 5, (Fig. 6), and the valve chamber $V^2$. This feature of the operation is indicated in Fig. 3, where the engine piston M is supposed to be moving toward the left-hand, while the throttle at R is now assumed to be closed, and the engine valve V, (in this instance shown as a common D form of slide-valve), is partially uncovering the port $p'$. Thus, from the conduit 20, the auxiliary steam-supply can flow past the lowered valve member 2, and a portion of the steam then flow through the by-pass pipe 9 to the cylinder, while another portion flows past said valve 2 into the conduit space 5, (as at $5^a$ or $5^{a'}$, in Fig. 3), thence into the valve-chest $V^2$ and, finally, passes in some part through the said port $p'$ into the cylinder. At this time, of course, the moving piston M operates on one side thereof to produce a relative vacuum in the cylinder end $n^2$, while on the other side the piston pushes the contents of the cylinder end $n^1$ toward the port $p$ and pipe 8.

When the locomotive is running at high speed with a short cut off, the use of this drifting valve system permits the usual reverse lever to be set in a somewhat lower position than otherwise desirable, and thus permits a corresponding increase in the travel of the cylinder valve, thereby more widely distributing the wear in the valve chest and also making a more freely drifting engine.

When my present invention is applied to locomotives in which the cylinder mechanism is provided with the relatively large piston valves now frequently used, particularly on locomotives employing high pressures and on superheater locomotives, the drifting valve, D, may be arranged directly on a portion,—as 4', Fig. 7,—of the cylinder casting (which thus takes the place of the member 4 as shown in Figs. 3 and 5), while the auxiliary conduit branches, here designated by 8' and 9', respectively, lead directly to the usual ports (not shown) which extend (in a well known manner) around the usual form of piston valve. In this arrangement and modification the mode of operation as regards all of the principal features and functions will be the same as already described in connection with Figs. 1 to 6 inclusive. However, the improved arrangement and construction thus briefly indicated in Figs. 7 and 8 constitutes and embodies additional improvements which are not fully illustrated or specifically claimed in this application, but which are intended to constitute in part the subject-matter of a separate application to be concurrently pending herewith.

The interior chamber of the casing 1, constitutes a portion,—a section or length,—in and of a conduit which leads from the boiler to the valve-chest through an auxiliary line that does not run via the throttle valve; and in said conduit section, the valve-member 2 is arranged (and is preferably guided therein) for being inclosed within a flowing stream in which this member is subjected at all times to the same pressure on all parts thereof excepting when there is an unbalance or inequality of pressures produced on and as between different portions of the valve-member surface by an exhausting of steam through one or more of the described four conduit channels which come together in said casing chamber. Thus it may be said that the means for causing a movement of said valve member is not either aforesaid steam supply by itself, nor the pressure thereof, but rather that it is a reduction of pressure due to the exhausting of steam from limited areas contiguous to the valve-member surfaces.

This exhaust action takes place through a port (as for instance, the port $h^2$, $h^{2\prime}$, and to by-pass pipe 8 or 9) which is wholly included within the area of the described three-zone valve-seat surface, so that in practice, the thinning stream of steam,—against which the valve is pressing while being seated,—normally flows between said seat-surface and valve surface from all directions toward such exhaust port; this action produces a cushioning effect of a most perfect character, since the valve-member when nearly but not fully seated, may be said to rest or bear upwardly upon a thin layer of rapidly-flowing steam which, in thickness, is being rapidly yet gradually reduced to zero; and, this film-like stream during the said seating operation, is being replenished by steam from one or the other, or from both, of the two conduits that lead from the boiler to said casing chamber.

Since, as will be evident from the drawings, (see Fig. 3$^b$), and no more steam (from the motive-power steam supply) can pass upwardly through the spaces $s^8$, between the large-diameter seat 1$^f$ and valve-face 2$^f$, than will (at the same moment) pass through the space $s^5$ between the more elevated and much smaller diameter surfaces 1$^d$ and 2$^d$, said lower and larger surfaces therefore operate as supplemental cushioning areas between which the upwardly moving current of steam forms an extended and thin,—but for the instant, a highly resistant,—layer or cushioning-film of an elastic character and well adapted and effective for preventing a too rapid completion of the closing movement of the valve-member 2 through the final stage of its upward closing stroke.

In passing upwardly between the faces 1$^f$, 2$^f$ (see Figs. 3$^b$ and 6), of the sealing zone, the current of steam naturally spreads or expands into the annular channel space $s^7$ of the zone $z^{13}$, (Fig. 3$^b$), and impinges against such areas as may be formed therein for coaction with such current or stream. These features and the various effects tend to modify or control the up-flowing stream and the action thereof upon the valve-member 2, with the result, as I now apprehend, of first somewhat choking such up-flowing stream and then by directing the current against the zone $z^{12}$, acting upwardly upon the member 2, while, in the meantime the accumulating steam in the channel $s^7$ is being depleted by a flowage, or exhausting thereof through the space $s^5$ between the faces 1$^d$, 2$^d$ of the zone $z^9$. Thus a highly complex action or interaction takes place during the brief time-interval while the member 2 is moving upwardly toward its fully closed position (Fig. 5), at which time the motive-power steam will have been cut off (from access to the by-pass line through the casing 1) by the combined action of said two separated zones $z^{11}$ and $z^9$. Also, at this time, the by-pass-closing zone $z^8$ of the member 2 will have been (by a movement of approach) brought to and seated against the casing-surface (as 1$^d$, Figs. 3$^c$ and 5), for thereby closing the by-pass line, and concurrently therewith terminating the exhausting of the current of steam into one or the other side branch (as 8 or 9, as the case may be) of said by-pass line, or (in some part and momentarily) into the conduit 20.

One feature of the present apparatus relates to the opening and closing of the said four ports of the valve-chamber in the drifting-valve casing, each one precisely simultaneously with each of the others, so that the port-closing faces operate on one movement of the valve-member, to begin the opening of each port at the same moment, and also,—on a reverse movement of that valve member, as 2,—to complete the closing of all the ports at the same instant. By this means, I avoid any period of delay, or interval of time, between the initial opening of any one said port relatively to such initial opening of any other said port,—and similarly as to the final or complete closing thereof. Thus, also, I avoid the serious objection of having the initial opening of the different ports take place in succession, in my present drifting-valve apparatus the simultaneous beginning of the movement of approach toward their respective seats, of all the port-closing faces or valve-face zones, secures a nearly uniformly progressing closing or opening,—as the case may be,—of the steam-supply ports and the by-pass ports, with the result that on the initial port-opening movement of the valve, and on even the slightest opening of these ports, all the streams flowing in the several conduits which come together in the casing 1, are instantly mingled and interact together within the casing, and thereby are brought into a state of proper and complete coaction which progressively varies in a proportionate manner with relation to all of said ports during the entire working stroke of the valve-member, and during both the port-unclosing and port-closing movements thereof.

Having thus described my invention it should be understood that I do not confine myself to all the details of construction, as there may be modification thereof and variation therein without departing from the spirit of my invention or exceeding the scope of the claims.

Having thus described my invention, I claim—

1. A drifting-valve comprising, with means for supplying independent pressure to the interior of said valve at the respective ends of the valve, a valve-casing, a valve-chamber having a plurality of port-openings therein, and a movable valve-member for said valve-chamber engageable with all of said port-openings, and adapted by pressure in one direction on an end thereof to be disengaged from all said port-openings to open the same simultaneously, and by pressure independent of the last mentioned pressure in a reverse direction on an opposite end of said valve-member to engage all said port-openings to close the same simultaneously.

2. A drifting valve comprising, with means for supplying independent pressure of the same character to the interior of said valve at the respective ends of the valve, a valve-casing, a valve-chamber having a plurality of port-openings therein, and a movable valve-member for said valve-chamber engageable with all of said port-openings, and adapted by pressure in one direction on an end thereof to be disengaged from all said port-openings to open the same simultaneously, and by pressure independent of the last-mentioned pressure, but of the same character, in a reverse direction on an opposite end of said valve member to engage all said port-openings to close the same simultaneously.

3. A drifting valve comprising, with means for supplying independent pressure to the interior of said valve at the respective ends of the valve, a valve-casing, a valve-chamber provided with a plurality of port-openings some of which are arranged therein in the line of valve movement and some of which are arranged therein transversely to the line of valve movement, and a movable valve-member for said valve-chamber engageable with all said port-openings, and adapted by pressure in one direction on an end thereof to be disengaged from all said port-openings to open the same simultaneously, and by pressure independent of the last-mentioned pressure in an opposite direction on an opposite end of said valve-member to engage all said port-openings to close the same simultaneously.

4. A drifting valve comprising, with means for supplying independent pressure of the same character to the interior of the valve at the respective ends of said valve, a valve-casing, a valve-chamber provided with a plurality of port openings some of which are arranged therein in the line of valve movement and some of which are arranged therein transversely to the line of valve movement, and a movable valve-member for said valve-chamber engageable with all said port-openings and adapted by pressure in one direction on an end thereof to be disengaged from all said port-openings to open the same simultaneously, and by pressure independent of the last-mentioned pressure, but of the same character, in an opposite direction on an opposite end of said valve-member to engage all said port-openings to close the same simultaneously.

5. A drifting-valve comprising, with a valve-casing and with means for supplying independent pressure to the interior of the valve at the respective ends of said valve, a valve-chamber provided with port-openings therein and provided with a plurality of conical valve-seat surfaces arranged in the same conical line, a plurality of said port-openings being located in a conical valve-seat surface, and a movable valve-member provided with a plurality of conical valve-surfaces for engaging all the conical valve-seat surfaces of said valve-chamber; said valve-member being adapted by pressure in one direction on the upper end thereof to open simultaneously all the port-openings of said valve-chamber, and by pressure independent of the last-mentioned pressure in a reverse direction on the lower end of said valve-member to close simultaneously all the port-openings of said valve-chamber.

6. A drifting-valve comprising, with a valve-casing and with means for supplying independent pressure to the interior of the valve at the respective ends of said valve, a valve-chamber provided with port-openings therein and provided with a plurality of conical valve-seat surfaces arranged in the same conical line, a plurality of said port-openings being located in a conical valve-seat surface, and a reciprocable valve-member provided with a plurality of conical valve-surfaces for engaging all the conical valve-seat surfaces of said valve-chamber; said valve-member being adapted by pressure in one direction on the upper end thereof to open simultaneously all the port-openings of said valve-chamber, and by pressure independent of the last-mentioned pressure in a reverse direction on the lower end of said valve-member to close simultaneously all the port-openings of said valve chamber.

7. A drifting valve comprising, with a valve-casing and with means for supplying independent pressure of the same character to the interior of the valve at the respective ends of said valve, a valve-chamber provided with port-openings therein and provided with a plurality of conical valve seat surfaces arranged in the same conical line, a plurality of said port-openings being located in a conical valve-seat surface, and a reciprocatable valve-member provided with a plurality of conical valve-surfaces for engaging all the conical valve-seat surfaces of said valve-chamber; said valve-member being adapted by pressure in one direction on the upper end thereof to open simultaneously all the port-openings of said valve-chamber, and by pressure independent of the last mentioned pressure, but of the same character, in a reverse direction on the lower end of said valve-member to close simultaneously all the port-openings of said valve-chamber.

8. A drifting valve comprising, with a valve-casing and with means for supplying independent pressure of the same character to the interior of said valve at the respective ends of the valve, a valve-chamber provided with port-openings therein and provided with a plurality of valve-seat surfaces all portions of which are similarly inclined to the line of the valve movement, a plurality of said port-openings being located in an inclined valve-seat surface, and a movable valve-member provided with a plurality of inclined valve-surfaces for engaging all the inclined valve-seat surfaces of said valve-chambers; said movable valve-member being adapted by pressure in one direction on the upper end thereof to open simultaneously all the port-openings of said valve-chamber, and by pressure independent of the last-mentioned pressure, but of the same character, in a reverse direction on the lower end of said valve-member to close simultaneously all the port-openings of said valve-chamber.

9. A drifting valve comprising, with a valve-casing and with means for supplying independent pressure to the interior of the valve at the respective ends of said valve, a valve-chamber provided with port-openings therein and provided with a plurality of valve-seat surfaces arranged in the same conical line comprising a conical long valve-seat portion and a conical short valve-seat portion, a plurality of said port-openings being located in said conical long valve-seat portion, and a movable valve-member provided with a plurality of conical valve-surfaces comprising a conical long valve-surface portion and a conical short valve-surface portion for engaging the valve-seat portions of said valve-chamber; said movable member being adapted by pressure in one direction on the upper end thereof to open simultaneously all the port openings of said valve-chamber, and by pressure independent of the last mentioned pressure in a reverse direction on the lower end of said valve-member to close simultaneously all the port-openings of said valve-chamber.

10. A drifting-valve comprising, with a valve-casing and with means for supplying independent pressure of the same character to the interior of the valve at the respective ends of said valve, a valve-chamber provided with port-openings therein and provided with a plurality of valve-seat surfaces all portions of which are similarly inclined to the line of valve movement comprising an inclined long valve-seat portion and an inclined short valve-seat portion, a plurality of said port-openings being located in said inclined long valve-seat portion, and a movable valve-member provided with a plurality of inclined valve-surfaces comprising an inclined long valve-surface portion and an inclined short valve surface portion for engaging the inclined valve-seat portions of said valve-chamber; said movable valve-member being adapted by pressure in one direction on the upper end thereof to open simultaneously all the port-openings of said valve-chamber, and by pressure independent of the last mentioned pressure, but of the same character in a reverse direction on the lower end of said valve-member to close simultaneously all the port-openings of said valve-chamber.

11. In a drifting-valve apparatus for cylinder-mechanisms having a cylinder with a piston therein, and a valve-chest with a distribution valve therein, the combination of a drifting-valve casing having therein a valve-chamber provided with a continuous seat-surface comprising three zones and also provided with four port-openings of which one port-opening is an inlet-port, of which a second port-opening is an outlet-port intermediate to said inlet-port and the valve-chest, and of which two port-openings are by-pass ports located in a zone which is in an intermediate position relatively to said inlet and outlet ports; by-pass conduits leading from said by-pass ports to the opposite ends, respectively, of the cylinder; and, a reciprocatable valve-member inclosed within said valve-chamber and comprising in one continuous surface three valve-face zones in position and fitted for simultaneously effecting three different closures, respectively, namely: one zone for closing said inlet port, a second zone for closing said outlet port, and a third and intermediate zone for closing the two by-pass ports.

12. A drifting valve comprising, with a steam boiler and a steam engine having a cylinder with a piston therein and having a valve-chest with a distributing valve therein, a valve-casing, a valve-chamber provided, with port-openings therein and provided with a plurality of conical valve-seat surfaces arranged in the same conical line, two of said port-openings being located in a conical valve-seat surface and being respectivey means for communication for said valve with the respective ends of the cylinder, and two of said port openings being respectively an inlet means to said valve for steam from said boiler and a means for communication for said valve with said valve-chest, and a movable valve-member provided with a plurality of conical valve-surfaces for engaging the conical valve-seat surfaces of said valve-chamber, whereby steam pressure through said inlet means on the upper end of said movable valve-member will open simultaneously all said port openings, and steam pressure on the lower end of said movable valve-member through said means for communication with said valve-chest will close simultaneously all said port openings.

13. A drifting valve comprising, with a steam boiler and a steam engine having a cylinder with a piston therein and having a valve-chest with a distributing valve therein, a valve-casing, a valve-chamber provided with port-openings therein and provided with a plurality of valve-seat surfaces all portions of which are similarly inclined to the line of valve movement, two or said port-openings being located in an inclined valve-seat surface and being respectively means for communication for said valve with the respective ends of said cylinder, and two of said port-openings being respectively an inlet means to said valve for steam from said boiler and a means for communication for said valve with said valve-chest, and a movable valve-member provided with a plurality of inclined valve-surfaces for engaging the inclined valve-seat surfaces of said valve-chamber, whereby steam pressure through said inlet means on the upper end of said movable valve-member will open simultaneously all said port-openings, and steam pressure on the lower end of said movable valve-member through said means for communication with said valve-chest will close simultaneously all said port openings.

14. A drifting valve comprising, with a steam boiler and a steam engine having a cylinder with a piston therein and having a valve-chest with a distributing valve therein, a valve-casing, a valve-chamber provided with port-openings therein and provided with a plurality of conical valve-seat surfaces comprising a conical long valve-seat portion and a conical short valve-seat portion, two of said port-openings being located in said conical long valve-seat portion and being respectively means for communication for said valve with the respective ends of said cylinder, and two of said port-openings being respectively an inlet means to said valve for steam from said boiler and a means for communication for said valve with said valve-chest, and a movable valve-member provided with a plurality of conical valve-surfaces comprising a conical long valve-surface portion and a conical short valve-surface portion for engaging the conical valve-seat portions of said valve-chamber, whereby steam pressure through said inlet means on the upper end of said movable valve-member will open simultaneously all said port-openings, and steam pressure on the lower end of said movable valve-member through said means for communication with said valve-chest will close simultaneously all said port-openings.

15. A drifting-valve comprising, with a steam boiler and a steam engine having a cylinder with a piston therein and having a valve-chest with a distributing valve therein, a valve-casing, a valve-chamber provided with port-openings therein and provided with a plurality of valve-seat surfaces all portions of which are similarly inclined to the line of valve movement comprising an inclined long valve-seat portion and an inclined short valve-seat portion, two of said port-openings being located in said inclined long valve-seat portion and being respectively means for communication for said valve with the respective ends of said cylinder, and two of said port-openings being respectively an inlet means to said valve for steam from said boiler and a means for communication for said valve with said steam chest, and a reciprocatable valve-member provided with a plurality of inclined valve-surfaces comprising an inclined long valve-surface portion and an inclined short valve-surface portion for engaging the valve-seat portions of said valve-chamber, whereby steam pressure through said inlet means on the upper end of said valve-member will be open simultaneously all said port-openings, and steam pressure on the lower end of said valve-member through said means for communication with said valve-chest will close simultaneously all said port-openings.

16. A drifting-valve comprising, with a steam boiler and a steam engine having a cylinder with a piston therein and having a valve-chest with a distributing valve therein, a valve-casing, a valve-chamber provided with port-openings therein and provided with a plurality of valve-seat surfaces all portions of which are similarly inclined to the line of valve movement comprising an inclined long valve-seat portion and an inclined short valve-seat portion, there being an intermediate partly vertical wall-surface portion between said inclined long and short valve-seat portions, two of said port-openings being located in said inclined long valve-seat portion and being respectively means for communication for said valve with the respective ends of said cylinder, and two of said port-openings being respectively an inlet means to said valve for steam from said boiler and a means for communication for said valve with said steam-chest, and a rotatable reciprocatable valve-member provided with a plurality of inclined valve-surfaces comprising an inclined long valve-surface portion and an inclined short valve-surface portion for engaging the inclined valve-seat portions of said valve-chamber, there being an intermediate partly vertical surface portion between said inclined long and short valve-surface portions affording with said intermediate partly-vertical wall-surface portion in said valve-chamber a means for passage in said valve-chamber, whereby steam pressure through said inlet means on the upper end of said valve-member will open simultaneously all said port-openings, and a steam pressure on the lower end of said valve-member through said means for communication with said valve-chest will close simultaneously all said port openings.

17. In a drifting-valve apparatus, in combination, a cylinder-mechanism comprising a cylinder with a piston therein, and a valve-chest with a distribution valve therein; a drifting-valve casing having therein a valve-chamber provided with a seat surface comprising three zones, and having four port-openings of which one port-opening is a relatively small inlet-port, of which a second port-opening is a relatively larger outlet-port intermediate to said inlet-port and the valve-chest, and of which two port-openings are by-pass ports located in a zone which is an intermediate position relatively to said inlet and out-let ports; by-pass conduits leading from said by-pass ports to the opposite ends, respectively, of the cylinder; and, a reciprocatable valve-member inclosed within said valve-chamber and comprising in one surface three valve-zones arranged for effecting three different closures, respectively, said valve-zones being arranged one zone for closing said relatively small inlet port, a second zone for closing said relatively larger outlet port, and a third and intermediate zone for closing the two by-pass ports.

18. In a drifting-valve apparatus, in combination, a cylinder-mechanism comprising a cylinder with a piston therein, and a valve-chest with a distribution valve therein; a drifting-valve casing having therein a valve-chamber provided with a continuous seat surface comprising three zones, and also provided with four port-openings of which one port-opening is a relatively small inlet-port, of which a second port-opening is a relatively larger outlet-port intermediate to said inlet-port and the valve-chest, and of which two port-openings are by-pass ports located in a zone which is in an intermediate position relatively to said inlet and out-let ports; by-pass conduits leading from said by-pass ports to the opposite ends, respectively, of the cylinder; and, a reciprocatable valve-member inclosed within said valve-chamber and comprising in one continuous surface three valve-zones in position and fitted for effecting three different closures, respectively, said valve-zones being arranged one zone for closing said relatively small inlet port, a second zone for closing said relatively larger outlet port, and a third and intermediate zone for closing the two by-pass ports.

19. In a drifting-valve apparatus, in combination, a cylinder-mechanism comprising a cylinder with a piston therein, and a valve-chest with a distribution valve therein; a drifting-valve casing having therein a valve-chamber provided with a continuous seat-surface of conical form and comprising three port-closing zones and also provided with four port-openings of which one port-opening is a relatively small inlet-port, of which a second port-opening is a relatively larger outlet-port intermediate to said inlet-port and the valve-chest, and of which two port-openings are by-pass ports located in a zone which is in an intermediate position relatively to said inlet and out-let ports; by-pass conduits leading from said by-pass ports to the opposite ends, respectively, of the cylinder; and, a reciprocatable valve-member inclosed within said valve-chamber and comprising in one continuous surface of conical form three valve-zones in position and fitted for effecting at the same instant three different closures, respectively, said valve-zones being arranged one zone for closing said relatively small inlet port, a second zone in position for closing said relatively larger outlet port, and a third and intermediate zone for closing the two by-pass ports.

20. In a drifting-valve apparatus, in combination, a valve-chamber having therein a multi-ported valve-seat-surface arranged with a plurality of non-contiguous ports, and having one said port arranged for connection with the valve-chest of a cylinder-mechanism, and also having one of said ports arranged for an inlet-port for an auxiliary steam supply; a reciprocatable valve-member inclosed in said valve-chamber and having one multi-port-closing valve-face corresponding with said multi-ported valve-seat-surface and arranged for simultaneously completing the closing of all of said ports, and having a second valve-face appurtenant to the valve-member and of a diameter larger than said multi-port-closing valve-face and constituting a supplemental cushioning area for the valve-member when closing.

21. In a drifting-valve apparatus, in combination, a valve-chamber having therein a multi-ported and conical valve-seat-surface arranged with a plurality of non-contiguous ports, and having one said port arranged for connection with the valve-chest of a cylinder-mechanism, and also having one of said ports arranged for an inlet-port for an auxiliary steam supply; a reciprocatable valve-member inclosed in said valve-chamber and having one-multi-port-closing valve-face corresponding with said conical and ported valve-seat-surface and arranged for simultaneously completing the closing of all of said ports, and having a second valve-face located in a fixed position on the valve-member and of a diameter larger than said multi-port-closing valve-face and constituting a supplemental cushioning area for the valve-member when closing.

22. In a drifting-valve apparatus, in combination, a cylinder-mechanism comprising a cylinder with a piston therein, and a valve-chest with a distribution valve therein; a valve-chamber having therein a multi-ported and conical valve-seat-surface arranged with four non-contiguous ports, and having communication through one of said ports with the valve-chest of the cylinder-mechanism, and also having another one of said ports arranged for an inlet-port for an auxiliary steam supply; a reciprocatable valve-member inclosed in said valve-chamber and having one multi-port-closing valve-face corresponding with said conical and ported valve-seat-surface and arranged for simultaneously completing the closing of all four of said ports, and a second valve-face located in a fixed position on the valve-member and constituting a supplemental cushioning area for the valve-member.

23. A drifting valve comprising a valve-casing, a valve-chamber provided with a plurality of port openings and provided with a plurality of conical valve-seat surfaces arranged in the same conical line, and a movable valve-member provided with a plurality of conical valve-surfaces for engaging all the valve-seat surfaces of said valve-chamber, and adapted by movement in one direction to open simultaneously all the port-openings of said valve-chamber, and by movement of said valve-member in a reverse direction to close simultaneously all said port-openings.

24. A drifting valve comprising a valve-casing, a valve-chamber provided with a plurality of port-openings and provided with a plurality of conical valve-seat surfaces arranged in the same conical line, and a movable valve-member of one piece construction provided with a plurality of conical valve-surfaces for engaging all the conical valve-seat surfaces of said valve-chamber, and adapted by movement in one direction to open simultaneously all the port-openings of said valve-chamber and by movement of said valve-member in a reverse direction to close simultaneously all said port-openings.

25. A drifting valve comprising a valve-casing, a valve-chamber provided with a plurality of port-openings and provided with a plurality of inclined valve-seat surfaces all portions of which are similarly inclined to the line of valve movement, and a movable valve-member having a plurality of inclined valve-surfaces for engaging all the inclined valve-seat surfaces of said valve-chamber, and adapted by movement in one direction to open simultaneously all the port-openings of said valve-chamber and by movement of said valve-member in a reverse direction to close simultaneously all said port-openings.

26. A drifting valve comprising a valve-casing, a valve-chamber provided with a plurality of port-openings and provided with a plurality of inclined valve-seat surfaces all portions of which are similarly inclined to the line of valve-movement, and a movable valve-member of one piece construction provided with a plurality of inclined valve-surfaces for engaging all the inclined valve-seat surfaces of said valve-chest, and adapted by movement in one direction to open simultaneously all the port-openings of said valve-chamber and by movement of said valve-member in a reverse direction to close simultaneously all said port-openings.

27. A drifting valve comprising a valve-casing, a valve-chamber provided with port-openings and provided with a plurality of conical valve-seat surfaces arranged in the same conical line, and a movable valve-member provided with a plurality of conical valve-surfaces for engaging all the conical valve-seat surfaces of said valve-chamber and provided at its upper end with a guiding means engaging a port-opening of said valve-chamber, and provided at its lower end with guiding means engaging the lower portion of said valve-chamber and affording a bottom-stop for said valve-member; said movable valve-member being adapted by movement in one direction to open simultaneously all the port-openings of said valve-chamber and by movement of said valve-member in a reverse direction to close simultaneously all said port-openings.

28. A drifting valve comprising a valve-casing, a valve-chamber provided with port-openings and provided with a plurality of conical valve-seat surfaces arranged in the same conical line comprising a conical long valve-seat portion and a conical short valve-seat portion, there being an intermediate partly-vertical wall-surface portion between said conical long and short valve-seat portions, and a movable valve-member provided with a plurality of conical valve-surfaces comprising a conical long valve-surface portion and a conical short valve-surface portion for engaging the conical valve-seat portions of said valve-chamber, there being an intermediate partly-vertical surface-portion between said conical long and short valve-surface portions affording, with said intermediate partly-vertical wall-surface portion of said valve-chamber, a means for passage in said valve-chamber; said movable valve-member being adapted by movement in one direction to open simultaneously all the port-openings of said valve-chamber and by movement of said valve-member in a reverse direction to close simultaneously all said port-openings.

29. A drifting valve comprising a valve-casing, a valve-chamber provided with port-openings and provided with a plurality of valve-seat surfaces arranged in the same conical line comprising a conical long valve-seat portion and a conical short valve-seat portion, there being an intermediate partly-vertical wall-surface portion between said conical long and short valve-seat portions, and a movable valve-member provided with a plurality of conical valve-surfaces comprising a conical long valve-surface portion and a conical short valve-surface portion for engaging the conical valve-seat portions of said valve-chamber, there being an intermediate partly-vertical surface-portion between said conical long and short valve-surface portions affording, with said partly-vertical wall-surface portions of said valve-chamber, a means for passage in said valve-chamber, said valve-member being provided at its upper end with a means for guiding engaging a port-opening of said valve-chamber, and provided at its lower end with guiding means engaging the lower portion of said valve-chamber and affording a bottom-stop for said valve-member; said movable valve-member being adapted by movement in one direction to open simultaneously all the port-openings of said valve-chamber and by movement of said valve-member in a reverse direction to close simultaneously all said port-openings.

HARRY G. BECKER.

Witnesses:
G. S. EDMONDS,
F. C. REARDON.

Copies of this patent may be obtained for five cents each, by addressing the "Commissioner of Patents Washington, D. C."